April 8, 1969 R. C. HELFRICH 3,436,838
DRYER CONTROL

Filed Sept. 29, 1967 Sheet 1 of 2

INVENTOR.
ROBERT C. HELFRICH
BY
Radford M. Reams
HIS ATTORNEY

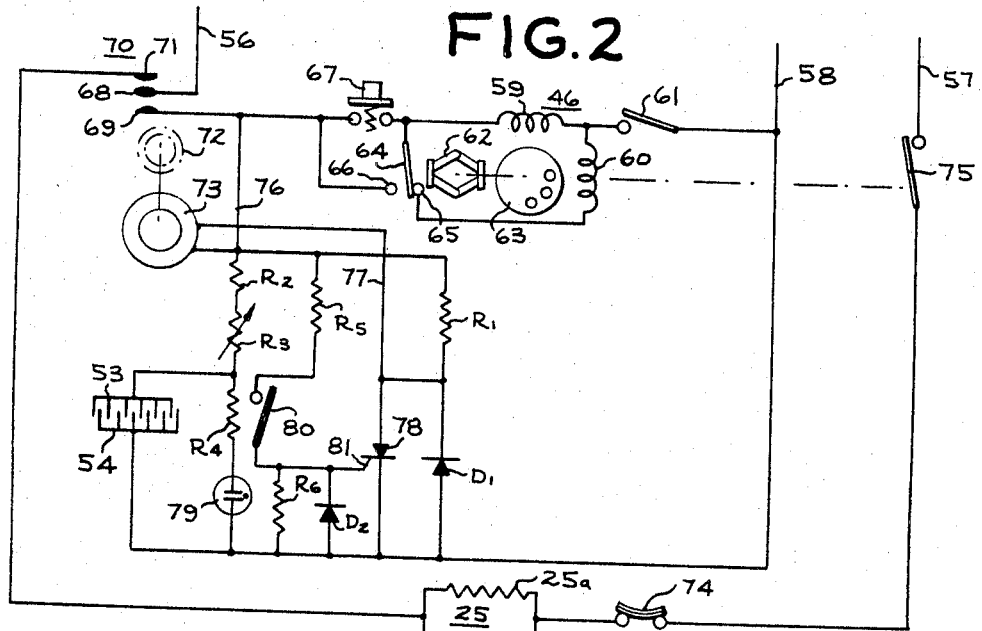
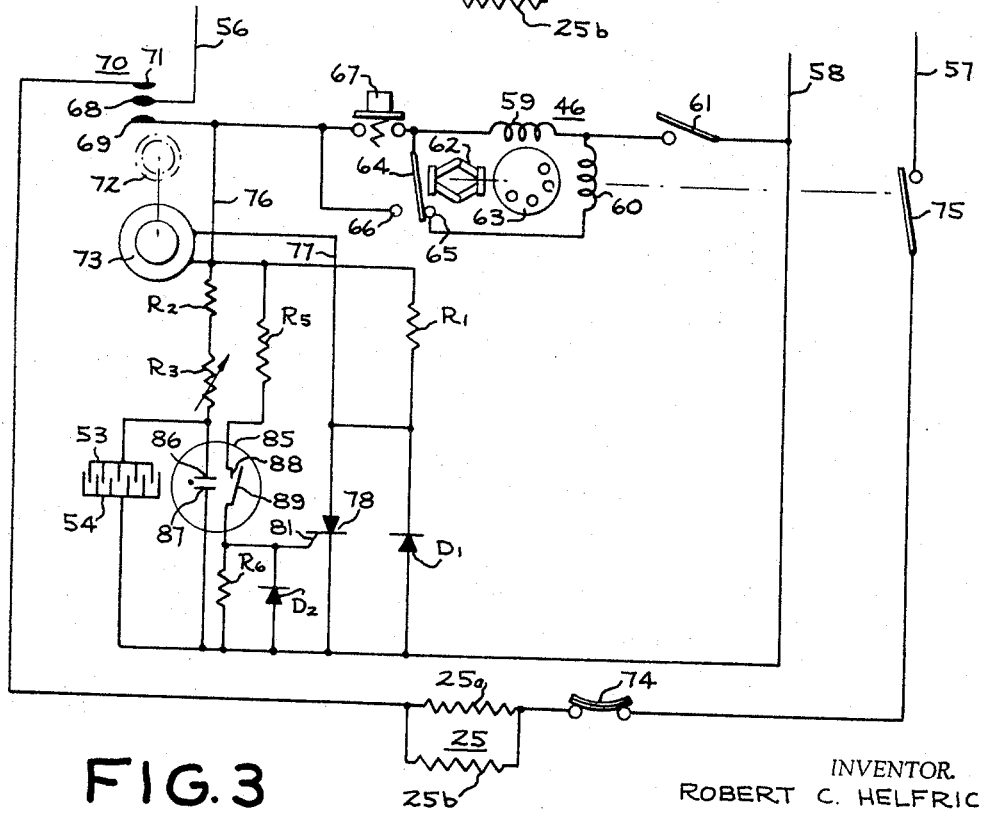

United States Patent Office 3,436,838
Patented Apr. 8, 1969

3,436,838
DRYER CONTROL
Robert C. Helfrich, Louisville, Ky., assignor to General Electric Company, a corporation of New York
Filed Sept. 29, 1967, Ser. No. 671,848
Int. Cl. H05b 1/02
U.S. Cl. 34—45    9 Claims

ABSTRACT OF THE DISCLOSURE

In a resistance measurement type dryer control the shut-off or timing motor is connected in the control circuit under the control of a controlled rectifier. The controlled rectifier is gated from a voltage divider network controlled by a thermally responsive switch. The switch responds to heat generated by a heating means, including a voltage breakdown device, connected across the resistance measurer.

Background of the invention

Most prior art resistance measurement type dryer controls utilize some kind of capacitive storage arrangement to provide a suitable time delay between the initial "dry" signal and shut-off of the machine. Almost all such controls, whether or not the capacitive storage type, have involved rectification of the alternating current supply signal to provide direct current energy for at least portions of the control. Such control arrangements are complicated and rather expensive.

It is an object of this invention to provide an improved control of a type other than the capacitive storing type.

It is another object of this invention to provide such an improved control which is of the alternating current type.

It is a further object of this invention to provide such a control which includes a minimum number of relative low cost, reliable parts.

Summary of the invention

In accordance with one aspect of this invention there is provided a control; for a dryer having a chamber to receive items to be dried and cyclically moving means for tumbling items within the chamber; including shut-off means, effective after energization to interrupt operation of the dryer. A voltage divider network is provided and includes sensing means positioned to contact items being dried to establish a current path therethrough having a resistance which is a function of the moisture content of items bridging the sensing means. Heating means, including voltage breakdown means, are connected across the sensing means so that the voltage breakdown means conducts to cause energization of the heating means in response to the voltage across the sensing means reaching a level corresponding to a predetermined degree of dryness of items bridging the sensing means. A thermally responsive switch is positioned in heat receiving relationship to the heating means. The switch is normally open and closes in response to heat received from the heating means. Control means interconnect the switch and the shut-off means to energize the shut-off means when the switch is closed.

Brief description of the drawings

FIGURE 2 is a schematic electrical circuit diagram of one embodiment of this invention; and FIGURE 3 is a schematic electrical circuit diagram of another embodiment of this invention.

Description of the preferred embodiments

Figure 1:
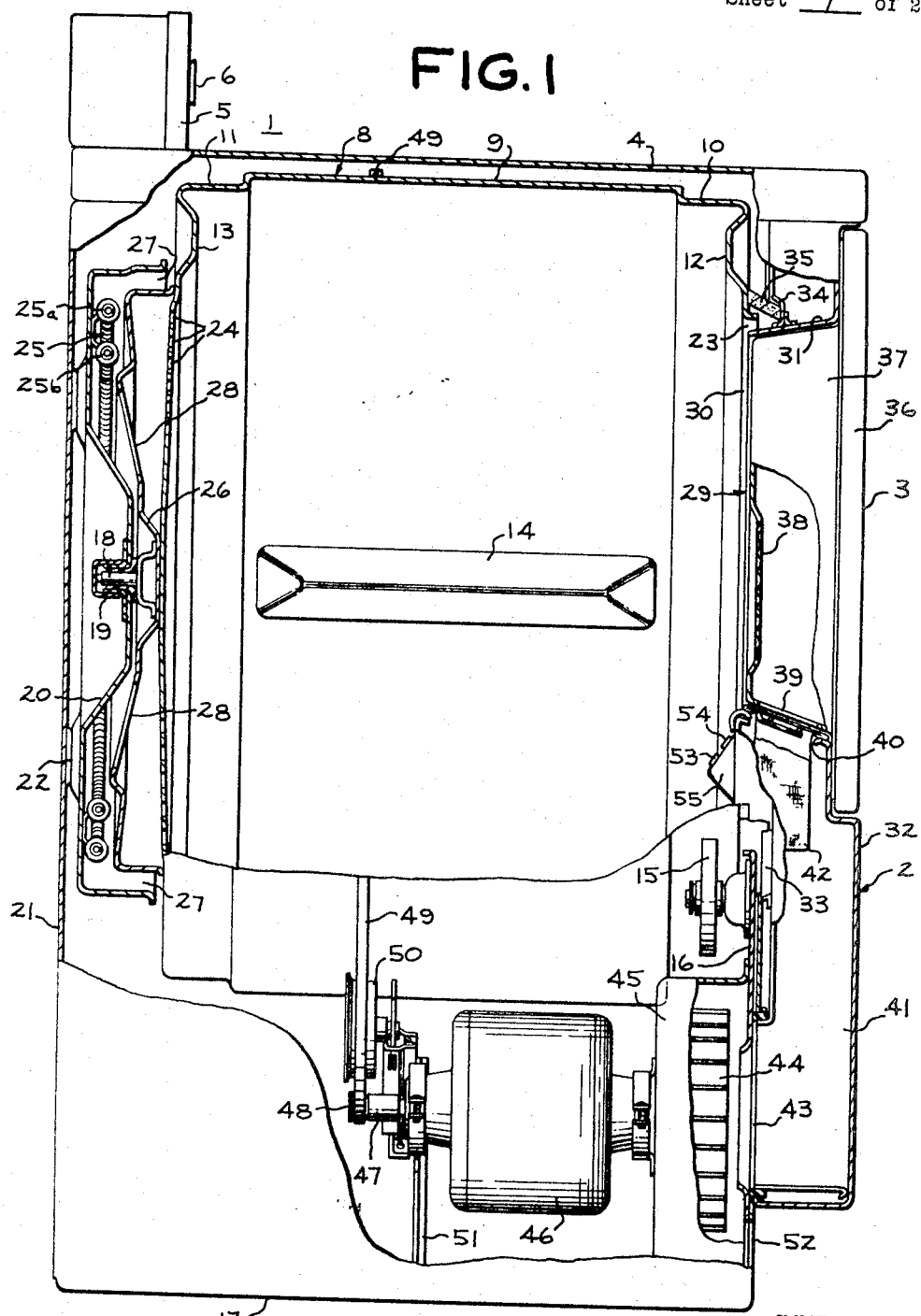
FIGURE 1 is a side elevational view of a clothes dryer suitable for incorporation of an improved dryer control of this invention, the view being partly broken away and partly sectionalized to illustrate details.

Referring now to FIGURE 1, the machine illustrated is a domestic clothes dryer generally indicated by the numeral 1. Dryer 1 is provided, in the usual way, with a cabinet 2 having a front door 3 to provide access to the interior of the cabinet. Provided on the top wall 4 of the cabinet 2 is a control panel 5 which may include a suitable manual control 6. By manual manipulation of control 6 the machine can be caused to start and automatically proceed through a cycle of operation.

Within cabinet 2 there is provided a fabric tumbling chamber, or drum 8, mounted for rotation on a substantially horizontal axis. Drum 8 is generally cylindrical in shape having a first, outer cylindrical wall portion 9, second and third outer, cylindrical wall portions 10 and 11, located adjacent the front and back of the drum respectively, a front wall 12 and a back wall 13. Outer wall portions 9, 10 and 11 are imperforate so that the outer shell of the basket is imperforate. A plurality of clothes tumbling ribs 14 are provided on the interior of wall portion 9 to lift fabrics as the drum rotates, and then allow them to tumble back to the bottom of the drum.

The front of drum 8 is rotatably supported within the outer casing 2 by suitable idler wheels, one of which is shown at 15 These wheels are mounted near the top of a member 16, which extends up from the base 17 of the machine. The wheels 15 are disposed beneath the drum and contact the portion 10 so as to provide a support on each side of the drum. The rear end of drum 8 receives support by means of a stub shaft 18 extending from the center of wall 13. Shaft 18 is secured within a bearing 19 supported by a baffle 20 which, in turn, is rigidly secured to the back wall 21 of cabinet 2 by any suitable means such as welding at a number of points 22. With this arrangement, the drum rotates about a horizontal axis with rollers 15 providing the front support and stub shaft 18 within bearing 19 providing the rear support.

In order to provide for the flow of a stream of drying air through the drum, the drum is provided with a central aperture 23 in its front wall 12 and with an opening in the form of a plurality of perforations 24 in its rear wall 13. Baffle member 20 also supports heating means 25, which includes two electrical resistance heating elements 25a and 25b, appropriately insulated from the baffle. A second member 26 is secured to the back wall 13 of the drum outside the ring of perforations 24 and within the stationary baffle 20, so that an annular air inlet 27 is, in effect, formed by baffles 20 and 26. In this manner a passage is formed for air to enter the annular inlet opening 27 between the baffles, pass over the heating means 25, pass through openings 28 formed in baffle 26, and through the perforations 24 to the interior of the drum 8.

The front opening 23 of the drum is substantially closed by means of a stationary bulkhead generally indicated by the numeral 29. Bulkhead 29 is made up of a number of adjacent members which include the inner surface 30 of access door 3, a stationary frame 31 for the door, formed as a flange of the front wall 32 of the cabinet, the inner surface member 33 of an exhaust duct which is formed by cooperation of member 33 with the front wall 32 of the cabinet, and an annular flange 34 mounted on frame 31 and on the duct wall. A suitable clearance is provided between the inner edge of the drum opening 23 and the edge of bulkhead 29 so that there will be no rubbing between the drum and bulkhead during rotation of the drum. To prevent any substantial air leakage through opening 23 between the interior and exterior of the drum, a suitable ring seal 35 is secured to flange 34 in sealing relationship to the exterior surface of drum wall 12.

Front opening 23 also serves as a means whereby clothes may be loaded into and unloaded from the drum. Door 3, whose inner surface 30 forms part of the bulkhead closing the opening, is mounted on cabinet 2 so that, when the door is open, clothes may be inserted into or removed from the drum through the door frame 31. The door includes an outer, flat, imperforate section 36 and an inwardly extending hollow section 37 mounted on the outer section. Hollow section 37 extends into the door frame 31 when the door is closed and the door surface 30 is the inner wall of the hollow section.

The air outlet from the drum is provided by a perforated opening 38 formed in the inner wall 30 of the hollow door section 37. The bottom wall section of door 3 and the adjacent wall of door frame 31 are provided with aligned openings 39 and 40. Opening 40 provides the entrance to the duct 41 formed by the cooperation of members 32 and 33. A lint trap 42 is positioned in the exhaust duct 41 at the opening 40, the trap being supported by the door frame 31.

Duct 41 leads downwardly to an opening 43 formed in the member 16. Opening 43 constitutes the inlet to a blower member 44, contained within a housing 45 and directly driven by an electric motor 46. An inlet, such as the opening 52, is provided to the cabinet so that the blower brings ambient air in through the opening 52, over the heater means 25, through the basket, through the door and duct 41, and then into the blower. From the blower the air passes through an appropriate duct (not shown) out of cabinet 2 so as to be exhausted from the machine.

In addition to driving blower 44, motor 46 constitutes a cyclically moving means for rotating the drum to tumble fabrics. To effect this rotation, motor 46 is provided with a shaft 47 having a small pulley 48 formed at the end thereof. A belt 49 extends around the pulley and completely around the cylindrical wall 9 of the drum 8. The relative circumferences of pulley 48 and wall section 9 cause the drum to be driven at a speed suitable to effect tumbling of the fabrics within the drum. A suitable idler assembly 50 is secured to the same support 51 which supports the pulley end of the motor and provides proper tensioning of the belt 49. Thus, operation of the motor both causes the fabrics to be tumbled within the drum and air to be forced through the drum. When the air is heated by heating elements 25a and 25b, the heated air passing through the drum causes vaporization of the moisture from the fabrics and the vapor is carried off with the air as it passes out of the machine.

In order to sense the amount of moisture in fabrics being dried in the drum 8, and thus obtain a suitable signal for controlling the operation of the dryer 1, sensing means are provided to contact the items being dried. In the machine of FIGURE 1, the sensing means is in the form of a pair of spaced sensors 53 and 54 which are mounted on an inwardly extending portion 55 of the member 33. The extension 55 is formed so that the conductors 53 and 54 are exposed to the interior of the drum and positioned to be contacted by the fabrics as they tumble within the drum.

Operation of the dryer of FIGURE 1 may be controlled by the new and improved electronic control schematically illustrated in the circuit diagram of FIGURE 2. As shown therein, the entire control of the machine may be energized across a three-wire power supply system which includes supply conductors 56 and 57 and a neutral conductor 58. For domestic use, the conductors 56 and 57 will be connected across a 220 volt alternating current power supply, with 110 volts appearing between the neutral conductor 58 and each of the supply conductors, and with the neutral conductor being at ground voltage.

Motor 46 is connected between conductors 56 and 58 and is a single phase, induction type motor having a main winding 59 and a start winding 60, both connected at a common end to conductor 58 through a conventional door switch 61, which is closed when the door 3 is closed and is opened when the door 3 is opened. Start winding 60 is connected in parallel with main winding 59 under the control of the speed responsive device such as that shown at 62, which is schematically illustrated as connected to the rotor 63 of the motor. The speed responsive device 62 controls a switch 64 which is engageable either with a contact 65 or a contact 66. Switch 64 engages contact 65 when the machine is at rest, and moves into engagement with contact 66 as the motor comes up to speed. It readily can be seen that engagement of switch 64 with contact 65 connects with start winding 60 and in parallel with the main winding 59, while movement of switch 64 away from this position opens the start winding. Thus, as rotor 63 comes up to speed the start winding becomes de-energized and the motor then continues to run on a main winding 59 alone.

The starting of the motor is provided by a manually operable switch 67 which may, for instance, in the structure of FIGURE 1 be moved to its closed position by depressing control member 6. Switch 67 connects the motor to supply conductor 56 through the contacts 68 and 69 of a switch 70, also having a contact 71. The switch 67 is normally biased to the open position as shown in FIGURE 2. When member 6 is depressed, assuming that contacts 68 and 69 are closed, energization of the motor is provided and, within less than a second under normal circumstances, the motor comes up to speed so that switch 64 moves from contact 65 to contact 66. As a result of this movement of the centrifugally operated switch 64, the main winding 59 of motor 46 continues to be energized by a bypass around switch 67 when member 6 is released and the switch 67 opens.

The switch 70 is controlled by a cam 72 which, in turn, is controlled by a timer motor 73 of the shut-off or timing control means. The cam 72 and timer motor 73 also are connected to manual control 6 so that rotation of the manual control causes the cam to rotate and close the contacts 68, 69, and 71 of switch 70. Thereafter, the cam 72 is controlled by the timer motor 73 and, after a predetermined period of operation of the timer motor, the cam is effective to cause the various contacts of switch 70 to be opened for terminating or interrupting the operation of the machine.

An energizing circuit for the heating means 25 is completed through the following circuit. Starting at conductor 56, the circuit proceeds through the contacts 68 and 71 of switch 70 to the heating means 25, then through a conventional temperature control thermostat 74 and a centrifugally responsive switch 75 to supply conductor 57. Switch 75 is controlled by centrifugal responsive member 62, being closed only when the motor has come up to speed so that there can be no energization of the heating means 25 except when motor 46 is operating properly.

One side of the timer motor 73 is connected through a conductor 76 to contact 69 and thence through contact 68 to supply conductor 56. The other side of the timer motor is connected to a conductor 77 which leads to neutral conductor 58 through either of two paths. The first of these paths is through the anode-cathode path of a controlled rectifier 78, while the other path is through the anode-cathode path of a diode D1. As indicated by FIGURE 2, the anode-cathode path of the controlled rectifier 78 and the anode-cathode path of the diode D1 are connected in opposite polarity. If gated, the controlled rectifier will conduct when the supply conductor 56 is positive with respect to neutral conductor 58 while diode D1 conducts when supply conductor 56 is negative with respect to the neutral conductor 58. The motor 73 is of the induction type and, therefore, will not run in response to only the half cycles of power conducted by diode D1. Thus, the controlled rectifier 78 must be gated to conduct at least a portion of the other half cycles of applied energy for the motor 73 to run.

It will be understood that motors such as 73 are inductive loads, wherein there is a large phase angle between the voltage and the current. In order to compensate for this situation and insure turn-off of the controlled rectifier and diode at the proper times, a resistance R1 is connected in parallel with the motor 73.

The sensors 53 and 54 are used to provide the control signal for gating the controlled rectifier 78. To this end the sensors are connected in the control circuit in the following manner. A connection is provided from conductor 76 through a fixed resistor R2 and a manually adjustable resistor R3 to the sensor 53. Sensor 54 is connected to neutral conductor 58. Fabricates bridging the sensors 53 and 54 complete a circuit from conductor 76, and thus supply conductor 56, to neutral conductor 58. The voltage across the sensors 53 and 54 will be a function of the relation between the resistance of the items bridging the sensors as compared to the combined resistance of R2 and R3.

A heating means is connected across the sensors 53 and 54 and includes, in the embodiment of FIGURE 2, a resistance R4 and a voltage breakdown device such as neon lamp 79. Thus, when the voltage across the sensors 53 and 54 reaches a value which is sufficiently high, the voltage breakdown device 79 will begin to conduct and current will flow through the series connection of resistance R4 and the voltage breakdown device. The heating effect of the current flow through the resistance R4 is utilized to close a normally open, thermally responsive switch 80, which is positioned in heat receiving relationship with the resistance R4. The switch 80 is connected between conductor 76 and conductor 58 in a second voltage divider network including a resistance R5 and a resistance R6. Thus when sufficient heat is received by the switch 80 from the resistance R4 the switch will close and current will flow from conductor 76 through the series connection of resistance R5, switch 80, and resistance R6.

The gate terminal 81 of the controlled rectifier 78 is connected between the switch 80 and the resistance R6. Thus when current flows through this second voltage divider network a voltage sufficient to gate or turn on the controlled rectifier 78 will be applied to its gate 81 and the controlled rectifier will begin to conduct during appropriate half cycles. Additionally, a second diode D2 may be connected between the gate and cathode of controlled rectifier 78 to protect the controlled rectifier against the application of peak reverse voltages.

With this control, operation of the machmine is begun by closing switch 61, rotating control 6 so as to cause cam 72 to close the contacts 68, 69 and 71 of switch 70 and momentarily depressing control 6 to close switch 67. The main motor 46 begins to rotate and quickly comes up to speed, causing switch 64 to engage contacts 66 and switch 75 to close. The motor then continues to run to rotate the drum for tumbling the fabrics and to draw air tnrough the dryer and the heating means 25 is energized to heat the air to evaporate moisture from the items in the drum. The voltage between conductors 56 and 58 is applied to the voltage divider network consisting of resistor R2, resistor R3, the sensors 53 and 54 and the items which are caused to bridge the sensors by the rotation of the drum. While the fabrics in the drum are relatively wet the resistance across the sensors 53 and 54 will be low compared to the total resistance of R2 and R3 and therefore the portion of the applied voltage appearing across the sensors will be too low to cause the voltage breakdown device 79 to conduct. The switch 80 therefore will remain open and no gate pulses will be provided to the controlled rectifier 78. With this condition, when supply conductor 56 is negative with respect to neutral conductor 58 current will flow through the rectifier D1, the conductor 77, the timer motor 73 and conductor 76 to the switch 70 and supply conductor 56. When supply conductor 56 is positive with respect to neutral conductor 58, current will attempt to flow from supply conductor 56 through switch 70, conductor 76, timer motor 73, and conductor 77 to neutral conductor 58. However, rectifier D1 blocks current flow in this direction and controlled rectifier 78 will conduct current in this direction only if gated. Since switch 80 is open the controlled rectifier is not gated and only half cycle power is provided to timer motor 73. As stated above, the timer motor 73 will not operate under these conditions.

As the items in the drum become drier the resistance across the sensors 53 and 54 increases. Eventually this resistance becomes sufficiently large with respect to the total resistance of R2 and R3 that the percentage of applied voltage appearing across the sensors is sufficient to cause the voltage breakdown device 79 to conduct. This causes current to flow through breakdown device 79 and resistance R4 is heated. At least a portion of this heat is received by the thermally responsive switch 80 and, after an appropriate time delay caused by the thermal delay normally incident to such switches, switch 80 will close. Thereafter, when conductor 56, and thus conductor 76 is positive with respect to conductor 58 a positive voltage will appear across resistance R6 and gate or turn on controlled rectifier 78. When controlled rectifier 78 conducting during at least a portion of half cycles of one polarity and rectifier D1 conducting during half cycles of the other polarity, the motor 73 will rotate. Under normal conditions the motor will continue to rotate and after a suitable period of time will cause cam 73 to open contacts 68 and 71. This de-energizes heater 25. The items in the dryer then begin to cool off and, after a suitable additional period of main motor operation to cause the items to be appropriately cooled, the timer motor 73 will cause cam 72 to open contacts 68 and 69, thus completely interrupting or terminating the operation of the machine.

As stated, the thermally responsive switch 80 exhibits a thermal time delay characteristic, i.e. there is a time delay after current through R4 begins to heat the switch before it closes and a similar time delay after current ceases to flow through resistance R4 before the switch open. This prevents instantaneous signals caused by individual items bridging the sensors 53 and 54 from beginning or stopping the conduction of the controlled rectifier 78. Thus this control will respond to the average condition of the load and compensate for variations between individual items.

The resistor R3 is manually adjustable so that the total resistance of the resistors R2 and R3 may be varied. By varying this total resistance the predetermined degree of dryness to which fabrics bridging the sensors 53 and 54 must reach in order to provide a voltage sufficient to cause breakdown device 79 to conduct may be varied by the user. Thus the control can provide both a dry and a damp dry setting as well as different settings for different types of fabrics.

For an electric dryer of the type presently marketed by the General Electric Company, assignee of the present invention, the following components have been found to be satisfactory for the control described.

D1—semiconductor rectifier sold by General Electric Company under the catalog No. Al3B2.
D2—semiconductor rectifier sold by General Electric Company under the catalog No. Al3B2.
R1—10 kilohms.
R2—1.67 megohms.
R3—variable from 0 to 1 megohm.
R4—10 ohms.
R5—165 kilohms.
R6—1,000 ohms.

Controlled rectifier 78—silicon controlled rectifier sold by General Electric Company under the catalog No. E106B.

Voltage breakdown device 79—neon lamp sold by General Electric Company under the catalog No. NE81.

It will be seen that, as thus far described this invention provides a new and improved dryer control operating on an alternating current basis without any capacitive storage to provide a time delay and that the control includes a minimum number of relatively low cost, reliable parts.

This invention also provides the possibility of further reducing the cost of the control. The voltage breakdown device 79 and resistance R4 form a heating means which functions to heat the thermally responsive switch 80 so as to energize the second voltage divider network including resistances R5 and R6. Presently marketed, well-known starting devices for fluorescent lamps include a voltage breakdown device of the neon lamp type with a thermally responsive micro-switch mounted within the envelope of the lamp and connected across the electrodes of the lamp. By modifying such a starter so as to have the microswitch mounted within the envelope of the neon lamp, but with its leads extending through the envelope separately, a further cost savings may be effected by eliminating the necessity for the resistance R4 and separate switch 80.

The control of FIGURE 3 schematically illustrates such a modified control. The circuit of FIGURE 3 is essentially the same as that of FIGURE 2 except for the gas discharge, voltage breakdown device 85, which takes the place of breakdown device 79, resistance R4 and switch 80 of FIGURE 2. In such a device one electrode 86 is connected between resistor R3 and sensor 53 and the other electrode 87 is connected to neutral conductor 58. One contact 88 of an associated thermally responsive, micro-switch, is connected to resistance R5 and the other contact 89 is connected to resistance R6.

The overall operation of the control of FIGURE 3 is substantially the same as that of the control of FIGURE 2. As the items within the dryer become drier the voltage across the sensors 53 and 54 builds up until it reaches a level sufficient to cause an arc to occur between the electrodes 86 and 88. Thereafter device 85 begins to conduct between its electrodes. At least a portion of the heat produced by the arc impinges upon the movable contact 89 of the associated micro-switch and, after a suitable time delay caused by the thermal mass of the contact 89, it engages contact 88 to energize the second voltage divider network including resistance R5 and resistance R6.

The foregoing is a description of the illustrative embodiments of the invention and it is applicant's intention in the appended claims to cover all forms which fall within the scope of the invention.

What is claimed as new and desired to be secured by Letters Patent of the United States is:

1. A control for a dryer having a chamber to receive items to be dried and cyclically moving means for tumbling items within the chamber; including:
    (a) shut-off means, effective after energization to interrupt operation of the dryer;
    (b) a voltage divider network including sensing means positioned to contact items being dried to establish a current path therethrough having a resistance which is a function of the moisture content of items bridging said sensing means;
    (c) heating means, including voltage breakdown means, connected across said sensing means, said voltage breakdown means conducting in response to the voltage across said sensing means reaching a level corresponding to a predetermined degree of dryness of items bridging said sensing means to cause energization of said heating means;
    (d) a thermally responsive switch poistioned in heat receiving relationship to said heating means; said switch being normally open and closing in response to heat received from said heating means;
    (e) and controls means interconnecting said switch and said shut-off means to energize said shut-off means when said switch is closed.

2. A control as set forth in claim 1 wherein said heating means comprises a serially connected resistance and voltage breakdown device and said thermally responsive switch is positioned in heat receiving relationship with said resistance.

3. A control as set forth in claim 1 wherein said heating means includes a gas-discharge device and said thermally responsive switch is positioned in heat receiving relationship to said device.

4. A control as set forth in claim 1 wherein said control means includes a second voltage divider network interconnected with said thermally responsive switch to be energized when said switch is closed and a controlled rectifier connected in controlling relationship with said shut-off means and connected to said second voltage divider network to be gated in response to said second voltage divider network being energized.

5. A control for a dryer having a chamber to receive items to be dried and cyclically moving means for tumbling items within the chamber; including
    (a) a circuit for connection to a source of alternating curernt electrical energy;
    (b) timing means effective to terminate operation of the dryer after a predetermined amount of timing means operation, said timing means being connected in said circuit;
    (c) a voltage divider network connected in said circuit and including sensing means positioned to contact items being dried to establish a current path therethrough having a resistance which is a function of the moisture content of items bridging said sensing means;
    (d) heating means, including voltage breakdown means, connected across said sensing means, said voltage breakdown means conducting in response to the voltage across said sensing means reaching a level corresponding to a predetermined degree of dryness of items bridging said sensing means to cause energization of said heating means;
    (e) a thermally responsive switch positioned in heat receiving relationship to said heating means; said switch being normally open and closing in response to heat received from said heating means;
    (f) control means interconnecting said switch and said timing means to energize said timing means when said switch is closed.

6. A control as set forth in claim 5 wherein said heating means comprises a serially connected resistance and voltage breakdown device and said thermally responsive switch is positioned in heat receiving relationship with said resistance.

7. A control as set forth in claim 5 wherein said heating means includes a gas-discharge device and said thermally responsive switch is positioned in heat receiving relationship to said device.

8. A control as set forth in claim 5 wherein said control means includes a second voltage divider network interconnected with said thermally responsive switch to be energized when said switch is closed and a controlled rectifier connected in controlling relationship with said timing means and connected to said second voltage divider network to be gated in response to said second voltage divider network being energized.

9. A control for a dryer having a cabinet, a drum mounted for rotation within the cabinet to tumble items being dried and heating means to heat the items being dried; including:
    (a) a circuit to connect the dryer to a source of alternating current electrical energy;
    (b) timing means effective to terminate operation of the dryer after a predetermined amount of timing means operation;

(c) said timing means being connected in said circuit in series with the parallel connection of a diode and a controlled rectifier connected in opopsite polarity, so that said timing means operates when said controlled rectifier is gated;

(d) sensing means positioned to contact items being dried to establish a current path therethrough having a resistance which is a function of the moisture content of items bridging said sensing means;

(e) said sensing means being connected in said circuit in series with a first resistance to form a voltage divider network;

(f) the series connection of a second resistance and a voltage breakdown device connected in said circuit across said sensing means, so that said voltage breakdown device conducts in response to the voltage across said sensing means reaching a level corresponding to a predetermined degree of dryness of items bridging said sensing means;

(g) a thermally responsive switch positioned in heat receiving relationship with said second resistance, said switch being normally open and closing in response to heat received from said second resistance;

(h) a second voltage divider network connected in said circuit and including said switch so that said second network is energized when said switch is closed; and (i) said controlled rectifier being to said second network to be gated when said second network is energized.

References Cited
UNITED STATES PATENTS

| | | | |
|---|---|---|---|
| 3,116,982 | 1/1964 | McIlvaine | 34—45 |
| 3,224,107 | 12/1965 | Chafee | 34—45 |

FREDERICK KETTERER, *Primary Examiner.*

U.S. Cl. X.R.

307—118; 317—141; 318—483; 340—235